United States Patent
Walz et al.

(10) Patent No.: US 11,274,921 B1
(45) Date of Patent: Mar. 15, 2022

(54) PAYLOAD MEASUREMENT SYSTEM AND METHOD

(71) Applicant: WALZ SCALE, East Peoria, IL (US)

(72) Inventors: Matthew Walz, Whitefish, MT (US); Lars Pehrson, Brondby (DK)

(73) Assignee: Walz Scale, East Peoria, IL (US)

( * ) Notice: Subject to any disclaimer, the term of this patent is extended or adjusted under 35 U.S.C. 154(b) by 0 days.

(21) Appl. No.: 17/354,083

(22) Filed: Jun. 22, 2021

(51) Int. Cl.
| | |
|---|---|
| *G01B 11/30* | (2006.01) |
| *G01B 11/04* | (2006.01) |
| *G01S 17/89* | (2020.01) |
| *G06K 7/10* | (2006.01) |

(52) U.S. Cl.
CPC ............ *G01B 11/30* (2013.01); *G01B 11/043* (2013.01); *G01S 17/89* (2013.01); *G06K 7/10297* (2013.01)

(58) Field of Classification Search
CPC ....... G01B 11/30; G01B 11/043; G01S 17/89; G06K 7/10297
See application file for complete search history.

(56) References Cited

U.S. PATENT DOCUMENTS

| | | | | |
|---|---|---|---|---|
| 6,076,030 | A * | 6/2000 | Rowe ...................... | E02F 3/435 172/4.5 |
| 6,363,632 | B1 * | 4/2002 | Stentz ..................... | E02F 3/437 37/414 |
| 7,423,673 | B1 * | 9/2008 | Efrat ....................... | G02B 27/01 348/222.1 |
| 8,547,374 | B1 * | 10/2013 | Sadjadi ................... | G06T 17/00 345/419 |
| 8,930,091 | B2 * | 1/2015 | Upcroft ................... | E02F 9/26 701/50 |
| 2008/0075326 | A1 * | 3/2008 | Otani ...................... | G01C 11/06 382/106 |
| 2012/0114181 | A1 * | 5/2012 | Borthwick .............. | G06T 7/593 382/104 |
| 2015/0120126 | A1 * | 4/2015 | So ........................... | G01C 23/00 701/26 |
| 2016/0138905 | A1 * | 5/2016 | Einola ................... | G01B 11/105 356/634 |
| 2018/0142441 | A1 * | 5/2018 | Berry ..................... | E02F 9/265 |
| 2018/0179732 | A1 * | 6/2018 | Bartsch .................. | E02F 9/262 |
| 2020/0209401 | A1 * | 7/2020 | Motoyama ............ | G01S 17/931 |

* cited by examiner

*Primary Examiner* — Sang H Nguyen
(74) *Attorney, Agent, or Firm* — Hovey Williams LLP

(57) ABSTRACT

A system and method for measuring a payload including a surface, the system comprising a sensor and a processor. The sensor is configured to generate a signal constituting data representing an unobstructed portion of the surface and an obstacle obscuring a portion of the surface. The processor is communicatively coupled to the sensor and is configured to identify data points in the data corresponding to the unobstructed portion of the surface, identify data points in the data corresponding to the obstacle, interpolate between some of the data points corresponding to the unobstructed surface adjacent the data points corresponding to the obstacle, generate interpolation data points corresponding to the portion of the surface obscured by the obstacle, and determine a volume of the payload based on the data points corresponding to the unobstructed portion of the surface and the interpolation data points.

20 Claims, 6 Drawing Sheets

PAYLOAD MEASUREMENT SYSTEM AND METHOD

BACKGROUND

Payload, or the load carried by a truck, trailer, or other piece of equipment, must be measured and monitored for a variety of safety, regulatory, and planning reasons. Older payload measurement systems use weigh scales, but such scales are expensive, inconvenient, and costly to maintain. Modern payload measurement systems use line-of-sight scanners to make payload measurements. Some payloads are partially obscured from the line-of-sight scanners by obstructions, which renders their measurements inaccurate or unreliable. For example, truck and trailer beds typically include tarp support structures extending over the payloads, thereby preventing the effective use of line-of-sight scanners. Other obstructions may include loading booms, bed reinforcements, work equipment, and the like.

SUMMARY

Embodiments of the present invention solve the above-mentioned problems and other related problems and provide a distinct advance in the art of payload measurement systems. More particularly, the present invention provides a payload measurement system that accurately determines volume of a partially obscured payload.

An embodiment of the invention is a payload measurement system that interpolates between non-obscured portions of a payload. The payload measurement system broadly comprises a frame, a scanner, an RFID reader, a traffic signaler, a network unit, and a computer.

The frame supports electronic components of the payload measurement system. The frame is positioned near a drivable path, parking location, or bay for scanning a truck load or trailer load or near rail tracks for scanning a railcar load.

The scanner is mounted near a top overhanging portion of the frame and includes one or two sensors. The scanner is communicatively connected to the network unit via a communication cable and a power cable.

One sensor may be oriented to scan a width of the payload bed. This sensor may be a laser sensor (e.g., infrared laser scanner), LiDAR sensor, stereo camera, structured light sensor, or the like. The first sensor generates a signal or signals constituting data representing the payload and payload bed.

Another sensor may be oriented to scan a length of the payload bed. This sensor may be a laser sensor (e.g., infrared laser scanner), LiDar sensor, stereo camera, structured light sensor, or the like. Together, the sensors provide a 3-dimensional data representation of the payload and payload bed. The second sensor may be omitted if the length of the payload bed is known or determined by other means such as via an encoder mechanism.

The RFID reader detects RFID transmissions or fields from badges, ID decals, certificates, or the like to obtain metadata identifying loads to be scanned, trucks or railcars associated with the loads, or other information. The RFID reader is also configured to transmit the metadata to the computer.

The traffic signaler generates light signals, audio signals, or the like to instruct a vehicle or railcar mover operator to advance or stop. In one embodiment the traffic signaler may be mounted at windshield height for optimal visibility.

The network unit routes communications and electronic power between the scanner, RFID reader, traffic signaler, and computer. The network unit may be a modem, router, computing terminal, server, or the like.

The computer includes a raster input module, a processor unit, and a raster output module. The computer may also include a memory, a plurality of inputs, a display, external connectors, transceivers, and the like. The raster input module receives surface raster data (data representative of a surface of the payload) or similar data from the sensors. The raster output module receives surface raster data from the processor unit with occlusions removed.

In use, the sensors interrogate and/or sense the payload to generate a signal constituting data representing an unobstructed portion of the surface and data representing an obstacle (such as a tarp support structure) obscuring a portion of the surface. The data may form a raster representation, a three-dimensional point cloud, a vector representation, or the like.

The signal may then be transmitted to the raster input module. A second signal representative of a length of the payload bed may also be generated and transmitted to the raster input module. Alternatively, the length of the payload bed may be known or determined via other means.

A region of interest (ROI) may then be identified from the data points, with data points not included in the region of interest being discarded. This may be achieved via a filter, scanning boundaries or markers, image analysis, or the like. The ROI ensures only relevant data points are further processed.

Data points corresponding to the unobstructed portion of the surface may then be identified via the processor unit. Data points corresponding to the obstacle may also be identified via the processor unit. This may be done by determining data points having values larger than a threshold value, variable, or parameter. The threshold value, variable, or parameter may be static or dynamic depending on geometry of the surface.

Interpolation between some of the data points corresponding to the unobstructed surface adjacent the data points corresponding to the obstacle is then performed via the processor unit. Interpolation data points corresponding to the portion of the surface obscured by the obstacle may then be generated via the processor unit. Interpolation may include linear interpolation, inverse distance weighted interpolation, natural neighbor interpolation, Spline interpolation, Kriging interpolation, or the like. Interpolation type may be based on available processing resources or geometry of the surface.

The data points corresponding to the obstacle are then replaced by the interpolation data points. A volume of the payload based on the data points corresponding to the unobstructed portion of the surface and the interpolation data points is then determined.

In some embodiments, the above method may be performed first on an empty payload bed to determine a base data representation of zero volume. Specifically, the sensors obtain data representative of the payload bed. The volume of the payload is then determined as a difference between the data points of the loaded payload bed and the empty payload bed.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1A:
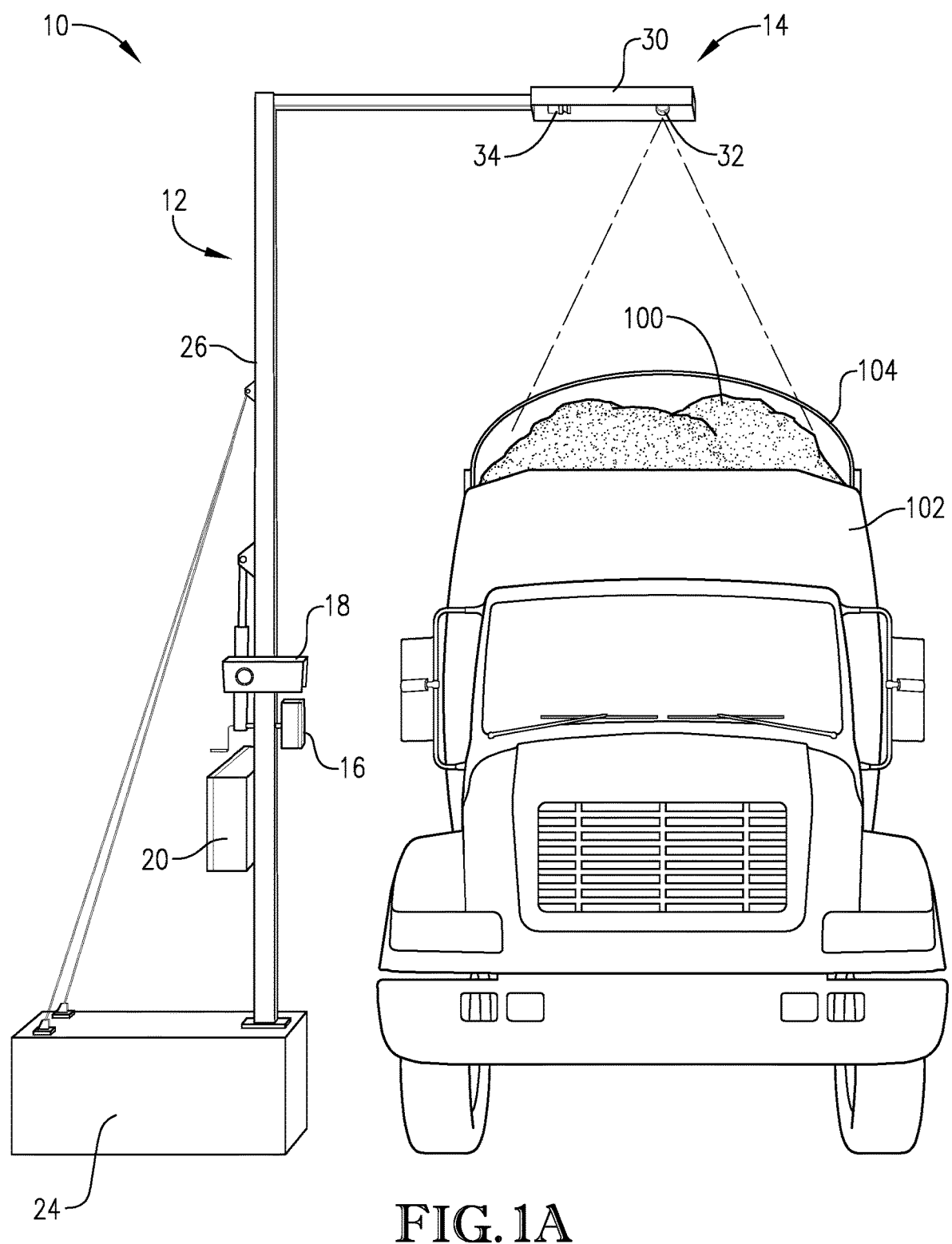
FIG. 1A is a front elevation view of a payload measurement system constructed in accordance with an embodiment of the invention.
Figure 1B:
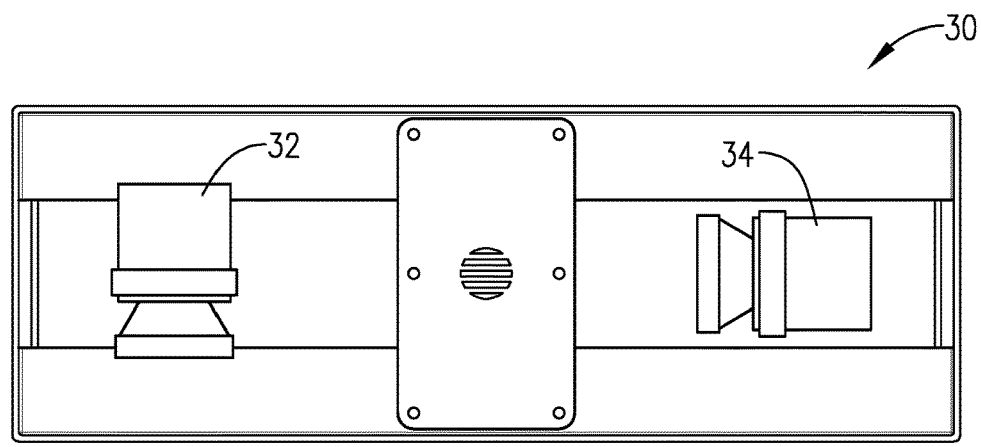
FIG. 1B is an enlarged bottom plan view of a scanner of the payload measurement system of FIG. 1A.
Figure 2:
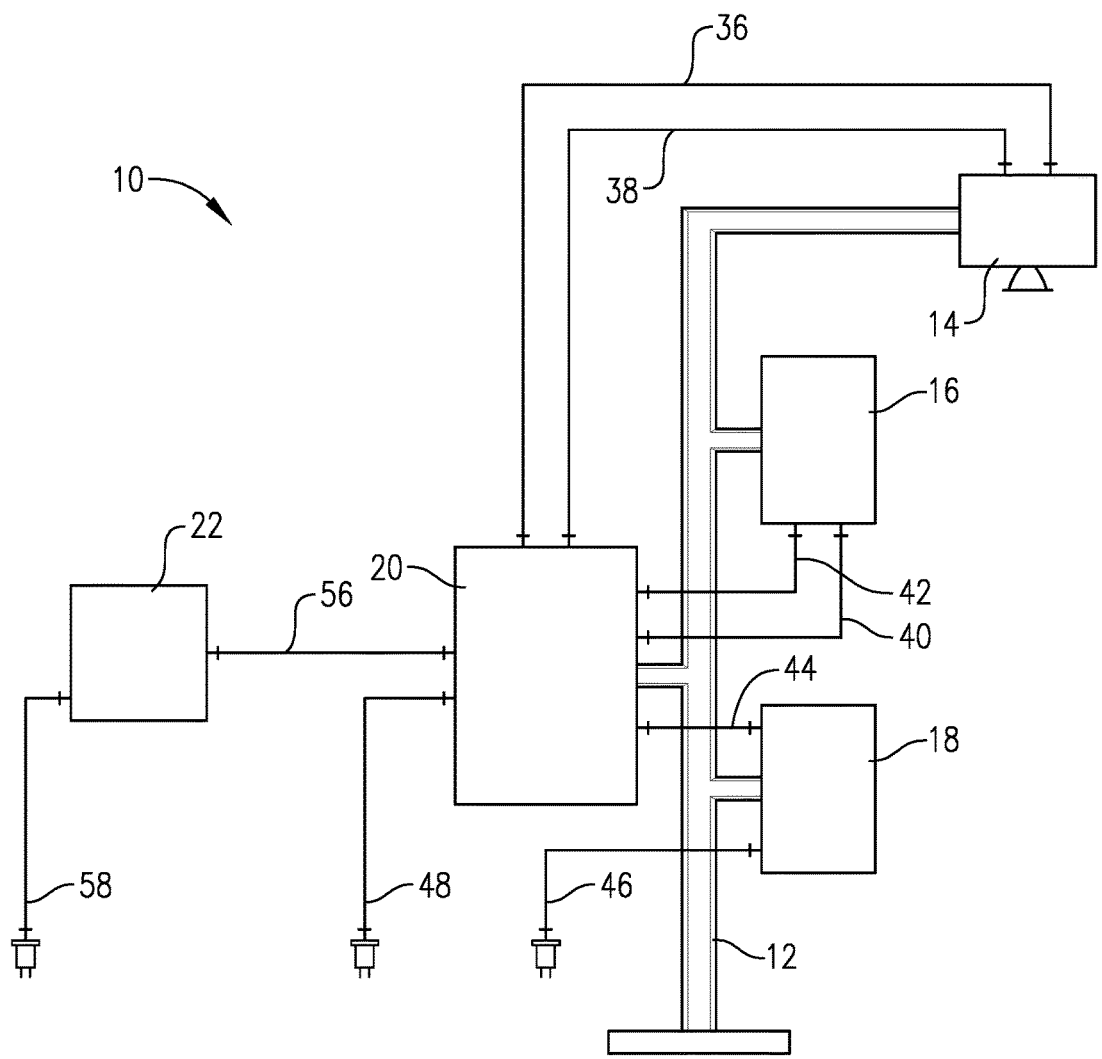
FIG. 2 is a schematic diagram of the payload measurement system of FIG. 1A.
Figure 3:
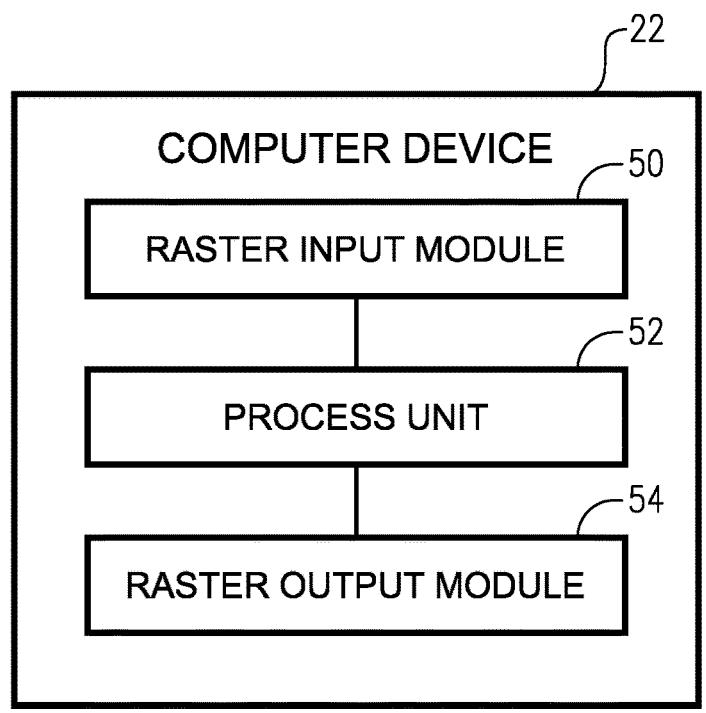
FIG. 3 is a schematic diagram of certain electronic components of the payload measurement system of FIG. 1A.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

Turning to FIGS. 1A-8, a payload measurement system 10 constructed in accordance with an embodiment of the invention is illustrated. The payload measurement system 10 broadly comprises a frame 12, a scanner 14, an RFID reader 16, a traffic signaler 18, a network unit 20, and a computer 22. The payload measurement system 10 may be used to measure the volume of a payload 100 of sand, gravel, marl, clay, topsoil, mulch, silt, peat, or any other transportable material.

The payload 100 may be loaded in a payload bed 102 of a truck (shown in FIG. 1A), trailer, conveyor system, rail car, or the like. The payload bed 102 may include obstacles 104 that obscure portions of the payload 100 from the scanner 14. The obstacles 104 are shown as tarp support structures, but other payload obscuring structures such as bed reinforcements may be present.

The frame 12 supports electronic components of the payload measurement system 10 and may include a base 24, a vertical member 26, and a horizontal member 28. The frame 12 may be positioned near a drivable path, parking location, or bay for scanning a truck load or trailer load or near rail tracks for scanning a railcar load. To that point, the vertical member 26 may support the horizontal member in an elevated position with the horizontal member 28 extending over the drivable path, parking location, bay, or rail tracks.

The scanner 14 may include a hood 30, a first sensor 32, and a second sensor 34. The scanner 14 may be mounted on a distal end of the horizontal member 28. The scanner 14 may be communicatively connected to the network unit 20 via a communication cable 36 and a power cable 38. Alternatively, the scanner 14 may be in wireless communication with the network unit 20 or the computer 22. In some embodiments, the scanner 14 may include only the first sensor 32 and thus may be considered to be the first sensor 32.

The hood 30 houses the first sensor 32 and second sensor 34. In one embodiment, the hood 30 also houses the RFID reader 16.

The first sensor 32 may be oriented to scan a width of the payload bed 102. The first sensor 32 may be a laser sensor (e.g., infrared laser scanner), LiDAR sensor, stereo camera, structured light sensor, or the like. The first sensor 32 may be configured to provide a signal or signals constituting data representing the payload 100 and payload bed 102.

The second sensor 34 may be oriented to scan a length of the payload bed 102. The second sensor 34 may be a laser sensor (e.g., infrared laser scanner), LiDar sensor, stereo camera, structured light sensor, or the like. Together, the first sensor 32 and second sensor 34 are configured to provide a 3-dimensional data representation of the payload 100 and payload bed 102. In one embodiment, the second sensor 34 is omitted if the length of the payload bed 102 is known or determined by other means.

The RFID reader 16 is configured to detect RFID transmissions or RFID fields from badges, ID decals, certificates, RFID chips, or the like to obtain metadata identifying loads to be scanned, trucks or railcars associated with the loads, or other information. The RFID reader 16 is also configured to transmit the metadata to the computer 22. The RFID reader 16 may be mounted on the vertical member 26 at windshield height or in the hood 30. The RFID reader 16 may be communicatively connected to the network unit 20 via a communication cable 40 and a power cable 42. Other vehicle identification mechanisms such as Automatic Number Plate Recognition (ANPR), barcode reading, Optical Character Recognition (OCR), manual operator input, and the like may be used.

The traffic signaler 18 generates light signals, audio signals, or the like to instruct a vehicle or railcar mover operator or driver to advance the payload (to be in range of the sensors 32, 34) or stop. In one embodiment the traffic signaler 18 may be mounted at windshield height for optimal visibility. The traffic signaler 18 may be communicatively connected to the network unit 20 via a communication cable 44. The traffic signaler 18 may also be powered by external power (e.g., 115 VAC, 230 VAC, 24 VDC, or similar) via a power cable 46.

The network unit 20 routes communications and electronic power between the scanner 14, RFID reader 16, traffic signaler 18, and computer 22. The network unit 20 may be a modem, router, computing terminal, server, or the like, and may be communicatively connected to the computer 22 via a communication cable 56. The network unit 20 may also be powered via a 115 VAC power cable 48.

The computer 22 includes a raster input module 50, a processor unit 52, and a raster output module 54. The computer 22 may also include a memory, a plurality of inputs, a display, external connectors, transceivers, power cable 58, and the like.

The raster input module 50 is configured to receive surface raster data 106 (data representative of a surface of the payload 100) or similar data from the first sensor 32 and second sensor 34. The raster input module 50 is also configured to communicate the surface raster data 106 to the processor unit 52 for processing.

The processor unit 52 may implement aspects of the present invention with one or more computer programs stored in or on computer-readable medium residing on or accessible by the processor. Each computer program preferably comprises an ordered listing of executable instructions for implementing logical functions in the processor. Each computer program can be embodied in any non-transitory computer-readable medium, such as the memory (described below), for use by or in connection with an instruction execution system, apparatus, or device, such as a computer-based system, processor-containing system, or other system that can fetch the instructions from the instruction execution system, apparatus, or device, and execute the instructions.

The raster output module 54 is configured to receive surface raster data 106 from the processor unit 52 with occlusions removed. The raster output module 54 may also be configured to present the surface raster data 106 via the display or transmit the data to a desired computing device.

The memory may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The inputs may comprise a keyboard, mouse, trackball, touchscreen, buttons, dials, virtual inputs, and/or a virtual reality simulator. The inputs allow a user to activate and control components of the payload measurement system 10.

The display may present virtual inputs, data spreadsheets and data tables, graphical data representations, computer models of the payload 100 and payload bed 102, fastener maps, and other information. The display may be a touchscreen, an LCD screen, an LED screen, and the like.

Figure 4:
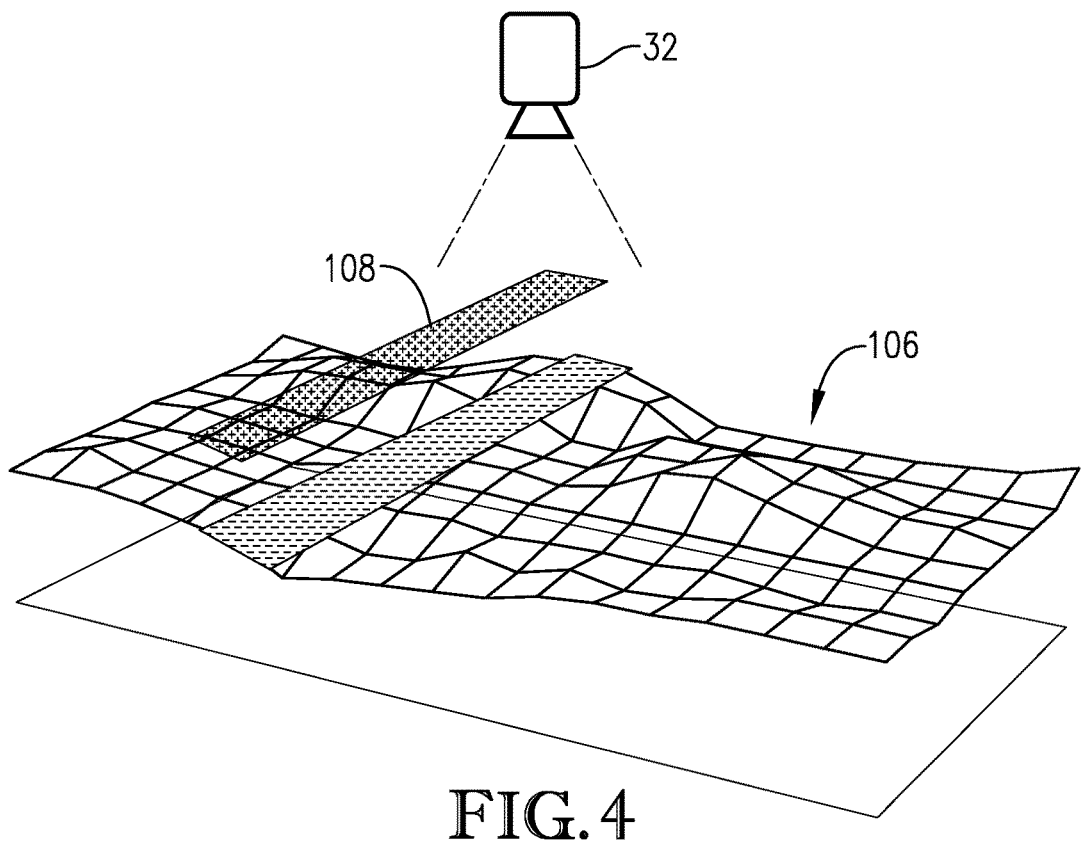
FIG. 4 is another graphical representation of measurements generated by the payload measurement system of FIG. 1A.
Figure 5:
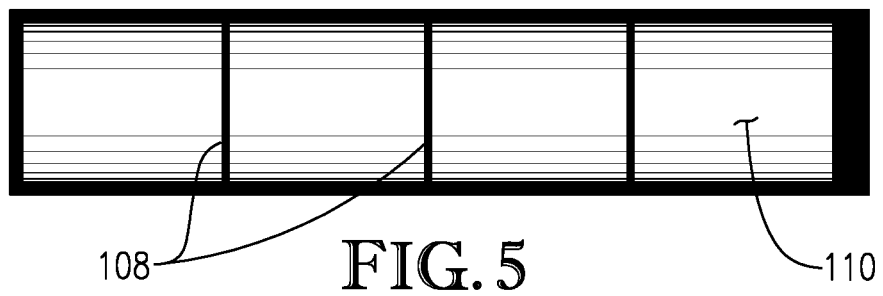
FIG. 5 is another graphical representation of measurements generated by the payload measurement system of FIG. 1A.
Figure 6:
FIG. 6 is another graphical representation of measurements generated by the payload measurement system of FIG. 1A.
Figure 7:
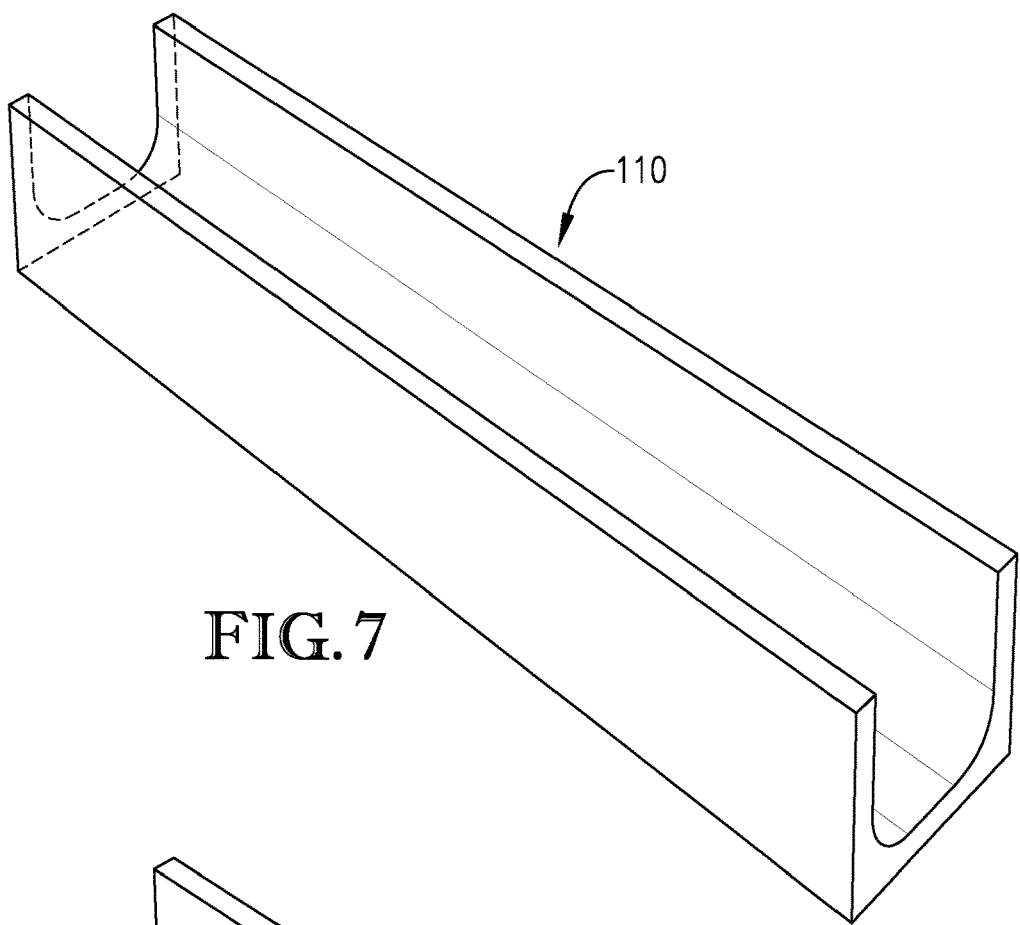
FIG. 7 is another graphical representation of measurements generated by the payload measurement system of FIG. 1A.
Figure 8:
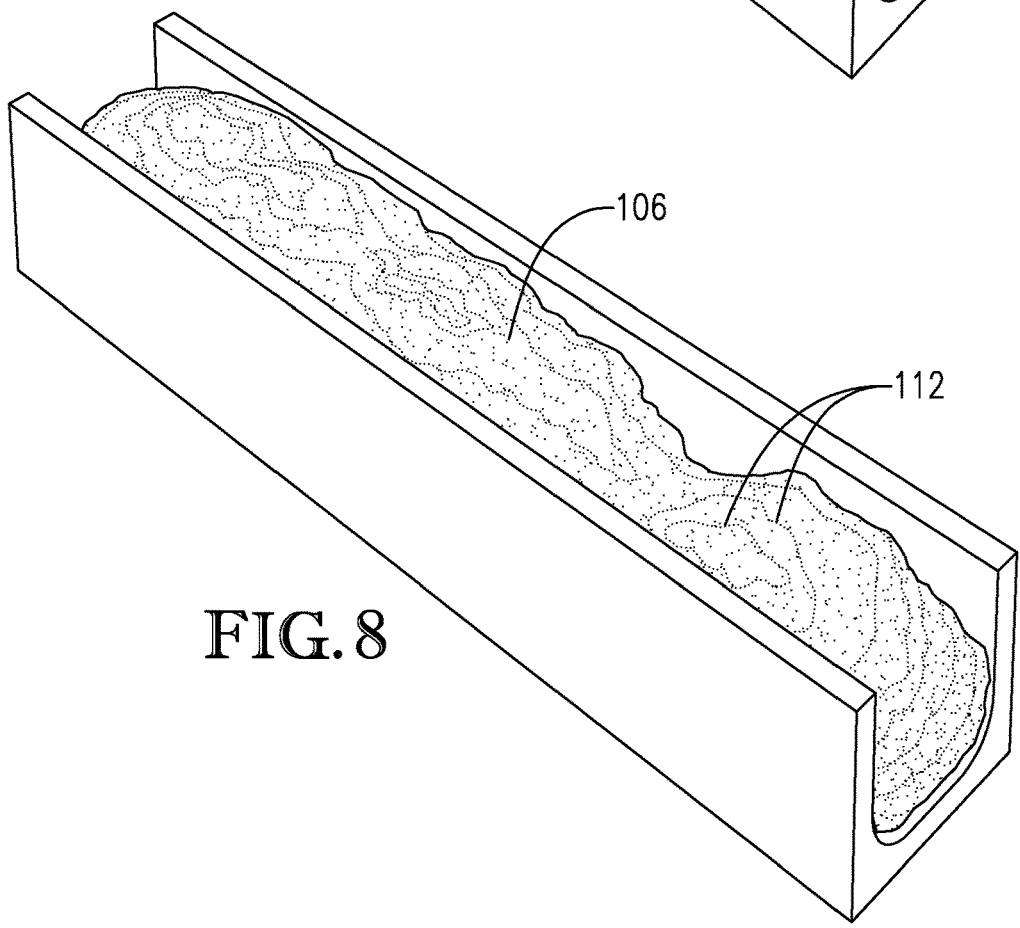
FIG. 8 is another graphical representation of measurements generated by the payload measurement system of FIG. 1A.
Figure 9:
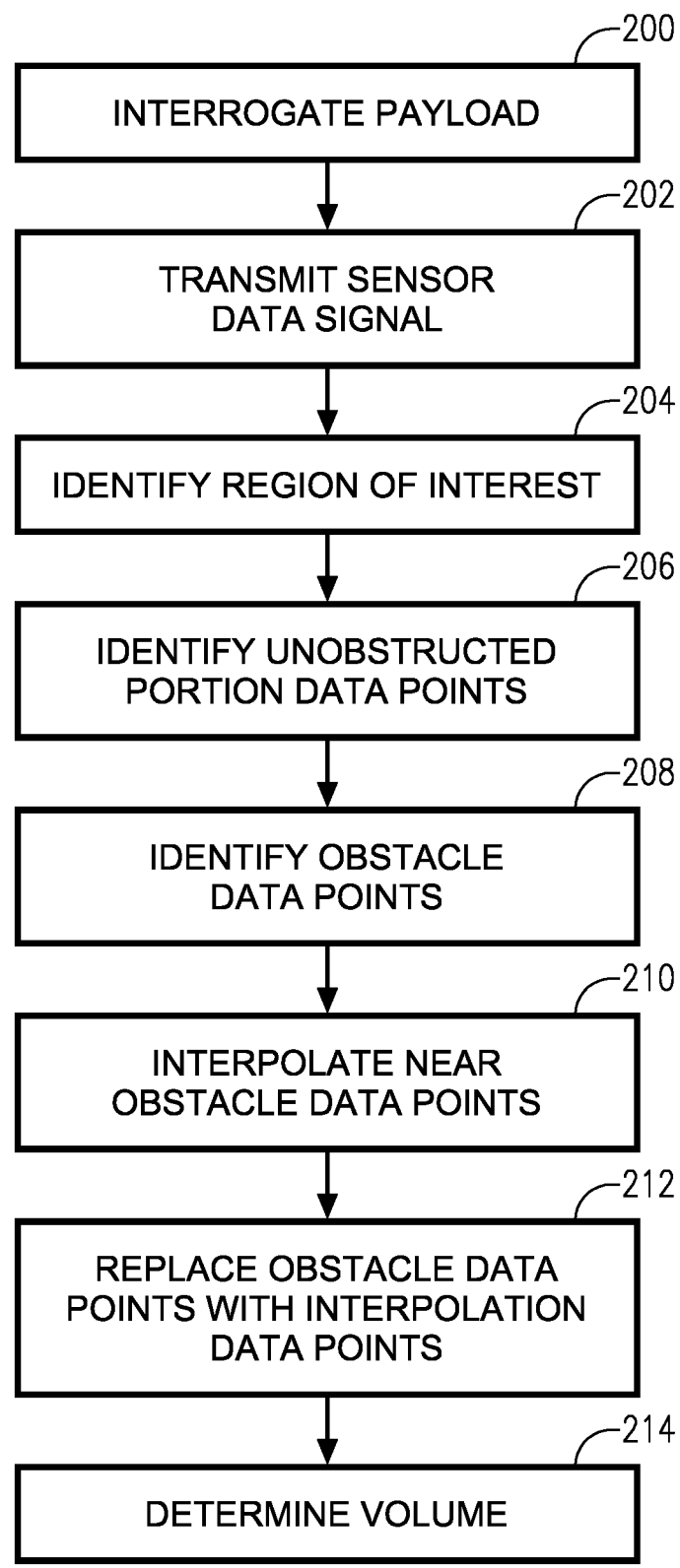
FIG. 9 is a flow diagram of method steps for measuring volume of a payload via the payload measurement system of FIG. 1A in accordance with an embodiment of the invention.

Turning to FIG. 9, and with reference to FIGS. 1A-8, use of the payload measurement system 10 will now be described. First, the sensors 32, 34 may interrogate the payload 100 to generate a signal constituting data representing an unobstructed portion of the surface (data 106) and data representing the obstacle 104 obscuring a portion of the surface 106 (data 108), as shown in block 200. This may include advancing the payload 100 under the sensors 32, 34 for a complete data profile of the payload 100. In alternative embodiments described below, the payload measurement system 10 may be mobile for scanning stationary payloads. The data 106, 108 may form a raster representation, a three-dimensional point cloud, a vector representation, or the like. For example, FIG. 4 shows a raster representation of varying heights of the payload 100. The obstacle 104 creates abnormally high data points 108 and prevents the creation of data points representing the portion of the surface obscured underneath. FIG. 5 shows a point cloud representation of an empty payload bed including obstacle data 108. FIGS. 6 and 7 shows the point cloud representation of FIG. 5 with the obstacle data 108 replaced by interpolated data, as described in more detail below. FIG. 8 shows a point cloud representation of the payload 100 with obstacle data 108 replaced by interpolated data, as described in more detail below.

The signal may then be transmitted to the raster input module, as shown in block 202. A second signal representative of a length of the payload bed 102 may also be generated and transmitted to the raster input module. Alternatively, the length of the payload bed 102 may be known or determined via other means.

A region of interest (ROI) may then be identified from the data points, with data points not included in the region of interest being discarded, as shown in block 204. This may be achieved via a filter, scanning boundaries or markers, data analysis (e.g., homogenous data points near edges of the scan), or the like. The ROI ensures only relevant data points are further processed.

Data points corresponding to the unobstructed portion of the surface 106 may then be identified via the processor unit 52, as shown in block 206. Data points corresponding to the obstacle 104 may also be identified via the processor unit 52, as shown in block 208. This may be done by determining data points having values larger than a threshold value, variable, or parameter. The threshold value, variable, or parameter may be static or dynamic depending on geometry of the surface 106.

Interpolation between some of the data points corresponding to the unobstructed surface (data 106) adjacent the data points corresponding to the obstacle 104 (data 108) may then be performed via the processor unit 52, as shown in block 210. Interpolation data points corresponding to the portion of the surface 106 obscured by the obstacle 104 may then be generated via the processor unit, as shown in block 212. Interpolation may include linear interpolation, inverse distance weighted interpolation, natural neighbor interpolation, Spline interpolation, Kriging interpolation, or the like. Interpolation type may be based on available processing resources or geometry of the surface 106.

The data points corresponding to the obstacle 104 (data 108) may then be replaced by the interpolation data points, as shown in block 216. A volume of the payload 100 based on the data points corresponding to the unobstructed portion of the surface (data 106) and the interpolation data points may then be determined, as shown in block 218.

The above method may be performed first on an empty payload bed 102 to determine a base data representation of zero volume, as shown in FIGS. 5, 6, and 7. Specifically, the sensors 32, 34 may obtain data representative of the payload bed 102 (data 110). The volume of the payload 100 may then be determined as a difference between the data points of the loaded payload bed (data 106) shown in FIG. 8 and the data points of the empty payload bed (data 110) shown in FIG. 7.

The above-described payload measurement system 10 provides several advantages. For example, interpolating between data points corresponding to the unobstructed surface (data 106) adjacent the data points corresponding to the obstacle 104 (data 108) provides a more accurate volume measurements of the payload 100. This also allows measurements to be made without removing the obstacle 104. The payload measurement system 10 can also be reconfigured for different materials and payload beds. The payload measurement system 10 can be implemented virtually any-where a vehicle can travel and does not require weigh stations to be purpose-built. The RFID reader 16 also simplifies tracking of load data, particularly when several loads are measured.

In another embodiment, the payload measurement system 10 or frame 12 may be mobile. For example, the system 10 or frame 12 may include wheels or may be configured to move along a track. Alternatively, the frame 12 may be mounted on a vehicle such as a truck, a car, a utility vehicle, a rail truck, or the like. Similarly, the frame 12 may be mounted on a trailer configured to be towed by a vehicle or on a rail car. In yet another embodiment, the scanner 14 or hood 30 may be mounted on or an integral part of a traverse boom, linear module, linkage system, or the like. Alternatively, the frame 12 (or associated sensor or sensors) may be handheld or moveable by an operator. The frame 12 (or associated sensor or sensors) may also be integrated into an unmanned aerial vehicle (e.g., a drone) and remotely controlled or even a manned aerial vehicle such as a helicopter. In one embodiment, instead of a sensor for determining payload bed length, an encoder mechanism or other means may be used to determine payload bed length based on a distance the sensor 32 moves during sensing. The mobile payload measurement system 10 can be used to scan payloads of parked vehicles and trailers, disconnected railcars or railcars connected to an idle train, and even payloads that have not been loaded yet or have been dumped.

ADDITIONAL CONSIDERATIONS

The description and drawings are illustrative and are not to be construed as limiting. Numerous specific details are described to provide a thorough understanding. However, in certain instances, well-known or conventional details are not described in order to avoid obscuring the description. References to one embodiment or an embodiment in the present disclosure are not necessarily references to the same embodiment; and, such references mean at least one.

The use of headings herein is merely provided for ease of reference, and shall not be interpreted in any way to limit this disclosure or the following claims.

References to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not for other embodiments. Unless excluded by explicit description and/or apparent incompatibility, any combination of various features described in this description is also included here.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines etc. are tangible units capable of performing certain operations and may be configured or arranged in a certain manner. In example embodiments, one or more computing systems (e.g., a standalone, client, or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as the processing system and control systems, may be implemented as special purpose or as general purpose devices. For example, the processing system may comprise dedicated circuitry or logic that is permanently configured, such as an application-specific integrated circuit (ASIC), or indefinitely configured, such as an FPGA, to perform certain operations. The processing system may also comprise programmable logic or circuitry (e.g., as encompassed within a general-purpose processor or other programmable processor) that is temporarily configured by software to perform certain operations. It will be appreciated that the decision to implement the processing system as special purpose, in dedicated and permanently configured circuitry, or as general purpose (e.g., configured by software) may be driven by cost and time considerations.

Accordingly, the terms "processing system" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing system is temporarily configured (e.g., programmed), each of the processing elements need not be configured or instantiated at any one instance in time. For example, where the processing system comprises a general-purpose processor configured using software, the general-purpose processor may be configured as respective different processing elements at different times. Software may accordingly configure the processing system to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may later access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for measuring a payload, the system comprising:
   a first sensor configured to generate a signal constituting data representing an unobstructed portion of a surface of the payload and an obstacle obscuring a portion of the surface; and
   a processor communicatively coupled to the first sensor, the processor being configured to:
     identify data points in the data corresponding to the unobstructed portion of the surface;
     determine data points having values larger than a threshold value to identify data points corresponding to the obstacle;
     interpolate between some of the data points corresponding to the unobstructed surface adjacent the data points corresponding to the obstacle;
     generate interpolation data points corresponding to the portion of the surface obscured by the obstacle; and
     determine a volume of the payload based on the data points corresponding to the unobstructed portion of the surface and the interpolation data points.

2. The system of claim 1, the first sensor being further configured to generate a signal constituting data including data points corresponding to an empty container, the processor being further configured to determine the volume based on the data points corresponding to the empty container.

3. The system of claim 1, the processor being further configured to determine a region of interest and disregard data points outside the region of interest.

4. The system of claim 1, wherein a type of the interpolation is based on at least one of available processing resources and geometry of the surface.

5. The system of claim 1, wherein a type of the interpolation is selected from the group consisting of linear interpolation, inverse distance weighted interpolation, natural neighbor interpolation, Spline interpolation, and Kriging interpolation.

6. The system of claim 1, further comprising a second sensor configured to generate a signal representative of a length of a container holding the payload, the processor being further configured to determine the volume based on the length of the container.

7. The system of claim 1, wherein the data forms at least one of a raster representation of the surface, a three-dimensional point cloud, and a vector representation of the surface.

8. The system of claim 1, the payload being at least temporarily stationary, the system further comprising a frame, the first sensor being mounted on the frame, the frame and hence the first sensor being moveable to scan the at least temporarily stationary payload, the processor being configured to determine a payload bed length based on movement of the first sensor.

9. The system of claim 8, the frame being configured to be remotely controlled.

10. A method of measuring a payload, the method comprising the steps of:
    generating via a first sensor a signal constituting data representing an unobstructed portion of a surface of the payload and an obstacle obscuring a portion of the surface;
    transmitting the signal to a processor;
    identifying data points corresponding to the unobstructed portion of the surface;

determining data points having values larger than a threshold value to identify data points corresponding to the obstacle;

interpolating between some of the data points corresponding to the unobstructed surface adjacent the data points corresponding to the obstacle;

generating interpolation data points corresponding to the portion of the surface obscured by the obstacle; and determining a volume of the payload based on the data points corresponding to the unobstructed portion of the surface and the interpolation data points.

11. The method of claim 10, further comprising a step of generating, via the first sensor, a signal constituting data including data points corresponding to an empty container, the volume being further determined based on the data points corresponding to the empty container.

12. The method of claim 10, further comprising steps of determining a region of interest and disregarding data points outside the region of interest.

13. The method of claim 10, wherein a type of the interpolation is based on at least one of available processing resources and geometry of the surface.

14. The method of claim 10, wherein a type of the interpolation is selected from the group consisting of linear interpolation, inverse distance weighted interpolation, natural neighbor interpolation, Spline interpolation, and Kriging interpolation.

15. The method of claim 10, further comprising a step of generating, via a second sensor, a signal representative of a length of a container holding the payload, the volume being further determined based on the length of the container.

16. The method of claim 10, wherein the data forms at least one of a raster representation of the surface a three-dimensional point cloud, and a vector representation of the surface.

17. The method of claim 10, the payload being at least temporarily stationary, the system further comprising a frame, the first sensor being mounted on the frame, the frame and hence the first sensor being moveable to scan the at least temporarily stationary payload, the method further comprising a step of determining a payload bed length based on movement of the first sensor.

18. A system for measuring a payload, the system comprising:
a first sensor configured to generate a signal constituting data representing an unobstructed portion of a surface of the payload and an obstacle obscuring a portion of the surface, the data forming a raster representation of the surface;
a second sensor configured to generate a signal constituting data representing a length of the payload
a processor communicatively coupled to the first sensor and second sensor, the processor being configured to:
determine a region of interest and disregard data points of the data outside the region of interest
identify data points corresponding to the unobstructed portion of the surface;
identify data points corresponding to the obstacle;
interpolate between some of the data points corresponding to the unobstructed surface adjacent the data points corresponding to the obstacle,
a type of the interpolation being based on at least one of available processing resources and geometry of the surface,
the interpolation being selected from the group consisting of linear interpolation, inverse distance weighted interpolation, natural neighbor interpolation, Spline interpolation, and Kriging interpolation;
generate interpolation data points corresponding to the portion of the surface obscured by the obstacle; and
determine a volume of the payload based on the data points corresponding to the unobstructed portion of the surface and the interpolation data points;
an RFID reader configured to sense an RFID field constituting metadata associated with the payload, the processor being further configured to identify the payload based on the metadata; and
a traffic signaler configured to alert a driver to position the payload near the sensors.

19. A system for measuring an at least temporarily stationary payload, the system comprising:
a moveable frame;
a first sensor mounted on the frame and configured to generate a signal constituting data representing an unobstructed portion of a surface of the payload and an obstacle obscuring a portion of the surface,
the first sensor being moveable via the frame to scan the at least temporarily stationary payload; and
a processor communicatively coupled to the first sensor, the processor being configured to:
identify data points in the data corresponding to the unobstructed portion of the surface;
identify data points in the data corresponding to the obstacle;
interpolate between some of the data points corresponding to the unobstructed surface adjacent the data points corresponding to the obstacle;
generate interpolation data points corresponding to the portion of the surface obscured by the obstacle;
determine a payload bed length based on movement of the first sensor; and
determine a volume of the payload based on the payload bed length and the data points corresponding to the unobstructed portion of the surface and the interpolation data points.

20. A method of measuring an at least temporarily stationary payload, the method comprising the steps of:
moving a first sensor to scan the at least temporarily stationary payload;
generating via the first sensor a signal constituting data representing an unobstructed portion of a surface of the payload and an obstacle obscuring a portion of the surface;
transmitting the signal to a processor;
identifying data points corresponding to the unobstructed portion of the surface;
identifying data points corresponding to the obstacle;
interpolating between some of the data points corresponding to the unobstructed surface adjacent the data points corresponding to the obstacle;
generating interpolation data points corresponding to the portion of the surface obscured by the obstacle;
determining a payload bed length based on movement of the first sensor; and
determining a volume of the payload based on the payload bed length and the data points corresponding to the unobstructed portion of the surface and the interpolation data points.

* * * * *